(12) United States Patent
Nowlan

(10) Patent No.: US 7,013,154 B2
(45) Date of Patent: Mar. 14, 2006

(54) MAPPING TEXT AND AUDIO INFORMATION IN TEXT MESSAGING DEVICES AND METHODS THEREFOR

(75) Inventor: Steven Nowlan, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 10/184,295

(22) Filed: Jun. 27, 2002

(65) Prior Publication Data
US 2004/0192355 A1 Sep. 30, 2004

(51) Int. Cl.
*H04Q 7/20* (2006.01)

(52) U.S. Cl. .................... 455/466; 455/566; 455/420; 455/414.4; 455/412.1; 455/413; 455/415; 455/418; 455/432.3; 455/425; 455/3.06; 379/142.06

(58) Field of Classification Search ............... 455/466, 455/566, 420, 414.4, 412.1, 413, 415, 418, 455/432.3, 425, 3.06; 340/7.58, 2.62, 2.58; 379/142.06
See application file for complete search history.

(56) References Cited

U.S. PATENT DOCUMENTS

| | | | |
|---|---|---|---|
| 5,574,771 | A | 11/1996 | Driessen et al. |
| 6,029,065 | A | 2/2000 | Shah |
| 6,070,053 | A | 5/2000 | Yamashita |
| 6,314,306 | B1 | 11/2001 | Harris |

*Primary Examiner*—Joseph Feild
*Assistant Examiner*—David Q. Nguyen
(74) *Attorney, Agent, or Firm*—Roland K. Bowler, II

(57) ABSTRACT

A text messaging device and methods including receiving a text message (510), determining whether text in the text message corresponds to reference text associated with audio information stored on the text messaging device (520), playing audio on the text messaging device corresponding to the audio information associated with the reference text if any text in the text message corresponds to the reference text associated with the audio information stored on the text messaging device (530), and displaying any text in the incoming text message that corresponds to the reference text associated with the audio information (540).

13 Claims, 3 Drawing Sheets

MAPPING TEXT AND AUDIO INFORMATION IN TEXT MESSAGING DEVICES AND METHODS THEREFOR

FIELD OF THE INVENTIONS

The present inventions relate generally to text messaging communications, and more particularly to associating text with audio information, for example mapping names to music, in text messaging devices, for example in wireless communications devices running GSM short messaging service (SMS) and enhanced messaging service (EMS) and 3GPP Multimedia Messaging Service (MMS) applications, text messaging devices with program segments, and methods therefor.

BACKGROUND OF THE INVENTIONS

Wireless text-messaging communication systems and text-messaging capable mobile wireless communications devices are known generally. As voice and data wireless communications technologies continue to merge, text-messaging services are increasingly provided with other data and voice communications services offered by network operators.

Exemplary text-messaging services include the short messaging service (SMS) and the enhanced messaging service (EMS) of the Global System for Mobile Communication (GSM) standard, the Multimedia Messaging Service (MMS) for $3^{rd}$ Generation Partnership Project (3GPP) standard, among other messaging system standards, some of which are proprietary, including those used on two-way wireless pagers and other dedicated text-messaging devices.

It is predicted that wireless text-messaging will increase substantially, thus prompting network operators to seek user-enriching, value-added services with distinguishing features that will increase their market share of the growing number of text messaging subscribers.

U.S. Pat. No. 6,314,306 B1 entitled "Text Messaging Originator Selected Ringer" discloses ring-tone parsing logic embedded in a designated ring-tone command field in a text message. The ring-tone command field is located in the text message between reserved characters, which may not be used during normal operation of the alphanumeric paging system. In U.S. Pat. No. 6314,306 B1, a ring-tone command is selected and inserted into the text message by the message originator for remotely controlling the ring-tone of the recipient device. Upon receipt of the text message, the recipient text-messaging device detects the extra ring-tone parsing logic by interpreting the ring-tone command field between the reserved characters. In U.S. Pat. No. 6,314,306 B1, any ring-tone parsing logic must be removed from the incoming text message to prevent display of the ring-tone commands, which are unintelligible. The recipient device then stores the text message and plays the ring-tone selected by the originator of the message, provided that the recipient device has not blocked or disabled remote control of the ring-tone.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
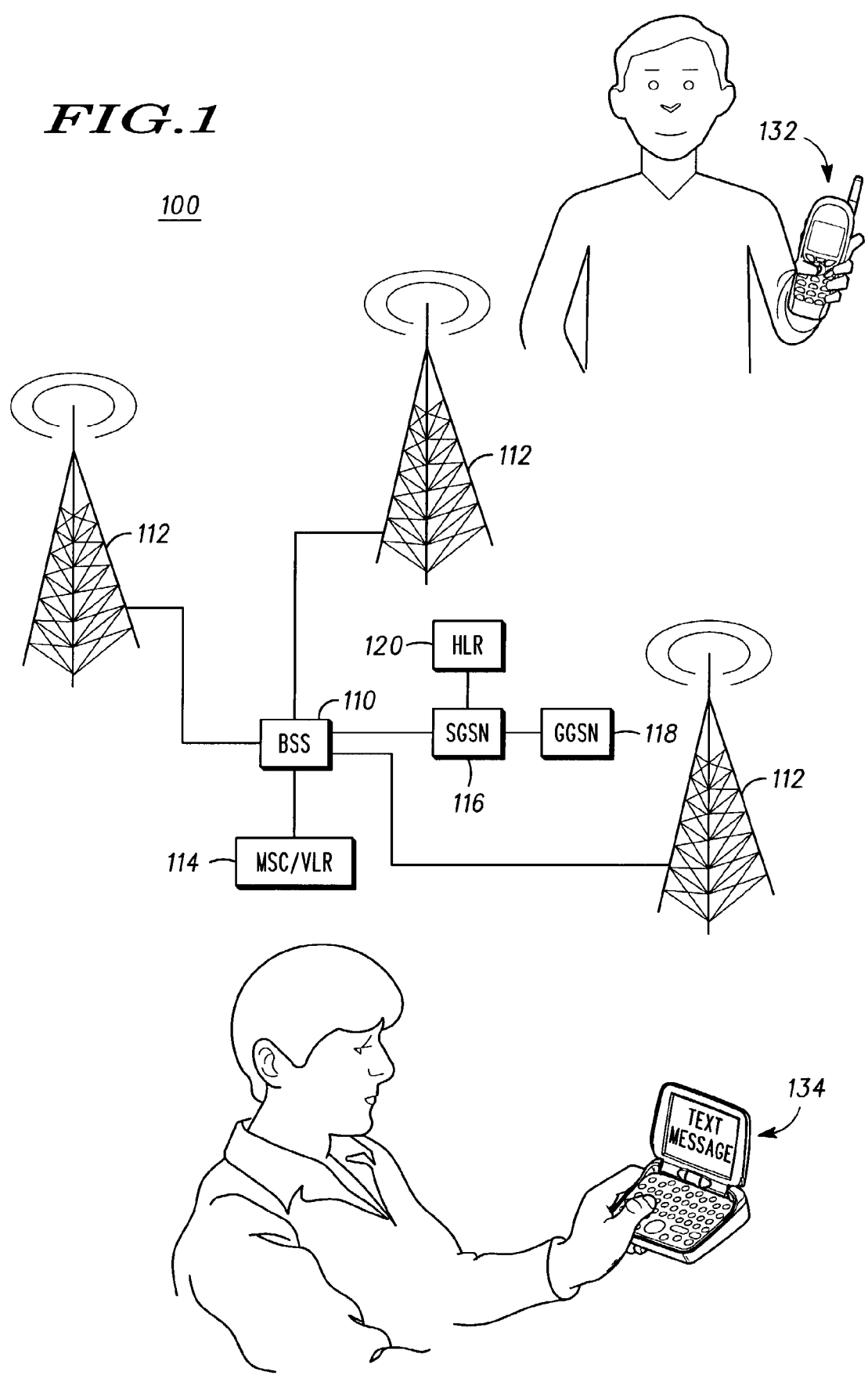
FIG. 1 is a general schematic of an exemplary text-messaging wireless network.

In FIG. 1, a typical Global System for Mobile Communication (GSM) wireless network 100 comprises generally a base station system (BSS) 110 having a base station controller in communication with multiple base station transmitters 112. The exemplary BSS 110 is coupled to a mobile switching center and visitor location register (MSC/VLR) 114 and to a serving GPRS support node (SGSN) 116. The SGSN 116 is coupled to a gateway GPRS support node (GGSN) 118 and to a home location register (HLR) 120. The MSC/VLR 114 is coupled to the SGSN 116 and to the HLR 120, which is also coupled to the GGSN 118, illustrated in FIG. 1.

Although the exemplary text messaging network embodiment is a wireless GSM and Universal Mobile Telecommunications System (UMTS), the inventions also apply to text messaging devices that communicate on other text messaging networks, including TDMA and W-CDMA wireless communications networks, among others, and wire-line networks, as will be apparent to those of ordinary skill in the art. These and other exemplary wireless networks may be coupled to other wireless and wire-line networks, including for example the Internet and intra-networks.

In FIG. 1, and in other text-messaging networks, text messages are communicated by and between text messaging service subscribers with text-messaging devices, for example the text messaging enabled cellular telephone handset 132 or the two-way messaging device 134 illustrated in FIG. 1. Other text-messaging devices include wireless enabled laptop computers, personal digital assistants (PDAs), a pocket computers, a desktop computers, network browsing devices, and any other text messaging enabled devices, including one-way pagers that receiver only incoming text messages without transmitting any messages.

Figure 2:
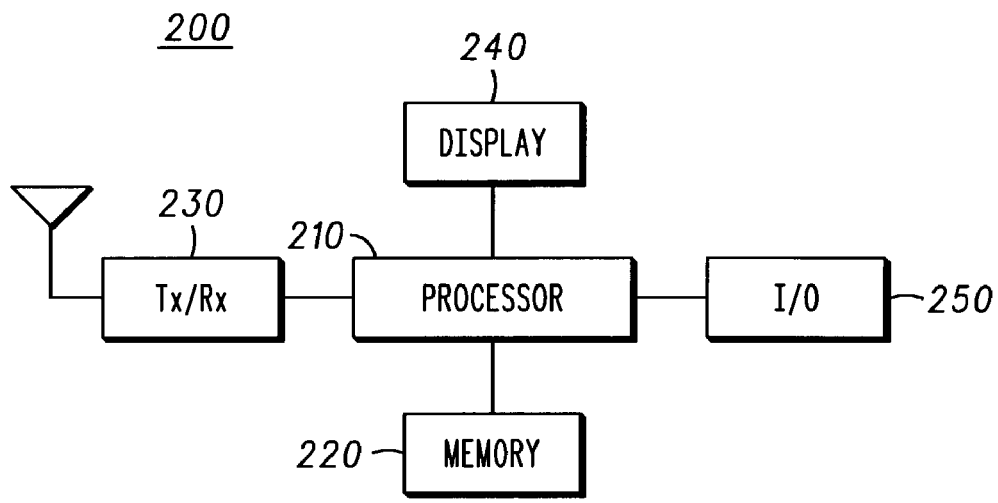
FIG. 2 is an exemplary text messaging capable two-way wireless communication device.

FIG. 2 illustrates generally a schematic block diagram of an exemplary text messaging capable wireless communications device 200 comprising generally a processor 210 coupled to memory 220, which includes generally RAM and ROM and in some embodiments programmable non-volatile memory. The exemplary subscriber device includes a transceiver 230 for transmitting and receiving text messages over a radio interface, although in other embodiments the device may include only a receiver for receiving incoming text messages, for example a one-way pager. A display 240 is also coupled to the processor for displaying text messages and for performing other functions discussed more fully below.

In FIG. 2, input and output devices, designated as I/O device 250, are also coupled to the processor 210. The input and output devices typically include, for example an alphanumeric keypad, a cursor controller device, and other input devices, a microphone, a loudspeaker and data ports, although all text messaging device embodiments may not include all of the these devices, and others may include inputs and outputs not specifically enumerated herein.

In one embodiment, the text messaging capable wireless communications device is a GSM short messaging service (SMS) enabled device. In another embodiment, the text messaging capable wireless communications device is a GSM enhanced messaging service (EMS) enabled device. And in another embodiment, the text messaging capable wireless communications device is a 3GPP Multimedia Messaging Service (MMS) enabled device. In yet other embodiments, the text messaging capable wireless communications device is enabled for any other messaging system standard, including those used on two-way wireless pagers and other dedicated text-messaging devices.

The text-messaging device, whether it is a wireless device or other communications device, also includes preferably the ability to produce different audio sounds, for example different tones, music, verse, mixable soundtracks, etc. The audio information may be stored on the text-messaging device as a .wav format file or some other format file. In some embodiments, the text-messaging device includes a tone or audio signal generator or synthesizer, for example a MIDI synthesizer, for generating polyphonic audio mixes. The synthesizer is part of the generally processor 210 in FIG. 2, which may also include a digital signal processor (DSP). In other embodiments, the audio synthesizer may be of another standard or a proprietary audio information synthesizer.

Figure 3:
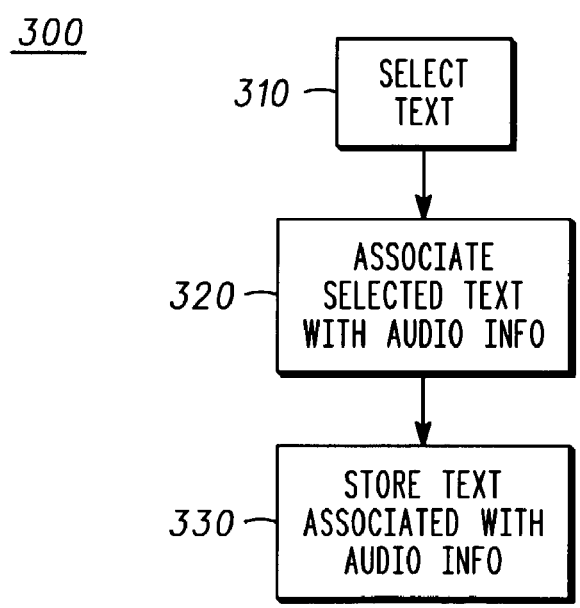
FIG. 3 is an exemplary process flow diagram for selecting and associating text with audio information.

In one embodiment, illustrated in the process flow diagram of FIG. 3, at block 310, a text messaging device user identifies text with which the user would like to associate audio information. This text is also referred to herein as reference text. The reference text may be text in a previously received text message or text from some other source, like a text file. In one embodiment, the text is a string of one or more ASCII characters, for example characters corresponding to a name or other words, which will later appear in text messages received and displayed for viewing by the text-messaging device. Generally the text includes any alphanumeric character or other symbol that will be displayed for interpretation by the user, preferably without the requirement that the reference text be edited out of the incoming text message prior to its display.

The reference text may be identified by selecting the text, for example by blocking or highlighting the text with an input device like a mouse, or a pointer or cursor moving keys. In one exemplary embodiment, reference text is identified by entering a text selection mode, for example by making a soft menu selection at a user interface, although more generally in other embodiments it is not necessary to enter a text selection mode. In one exemplary embodiment, the reference text is selected by moving a cursor over a first text character of a desired text string and pressing "enter", and then moving the cursor over a last character of the text string and again pressing "enter". Alternatively, the user may select text merely by inputting the text, for example at a user interface which prompts the user to input reference text.

In FIG. 3, at block 320, the selected text is associated with audio information stored on the mobile wireless communication device. In one exemplary embodiment, after blocking or highlighting the reference text or upon entering the reference text, the user selects audio information to be associated with the text, for example at a user interface invoked by entering an audio selection mode. The audio information is selected from a menu of stored audio files, for example .wav format audio files, or some other audio file format. In another embodiment, multiple soundtracks may be selected for combination in an audio mix produced, for example, by a MIDI synthesizer.

In one embodiment, the reference text is associated with the selected audio information by mapping the reference text to the associated audio information. In FIG. 3, at block 330, the selected text may be mapped to the audio information by storing, in memory on the mobile wireless communication device, the text with a reference identifying the audio information associated with the identified text. The reference may be a pointer, or an address for the associated audio information.

Figure 4:
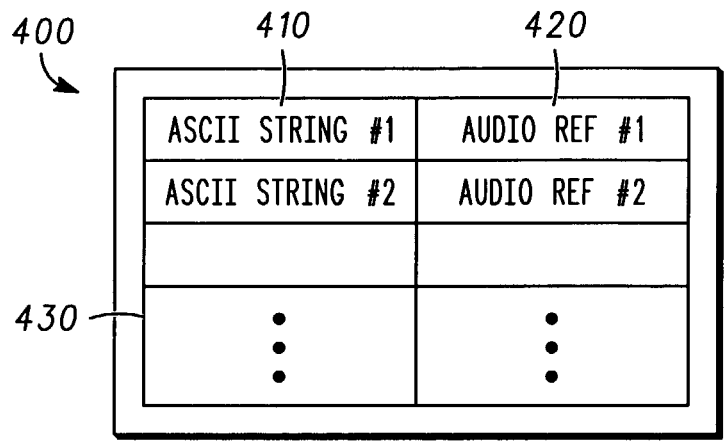
FIG. 4 is an exemplary multi-element memory table structure for mapping reference text and audio information.

In one exemplary embodiment, illustrated in FIG. 4, the mapping of the selected or identified referenced text and the audio information in memory 400 is produced by storing an ASCII string or some other textual string 410 corresponding to the reference text and storing the audio information reference 420 in a multi-element table structure 430 in non-volatile memory. The exemplary table has two elements. In other alternative embodiments, the selected text and the audio information may be associated in many other ways, the particulars of which are not essential to the invention, although some association schemes may be more desirable than others depending upon the particular application requirements, for example many mobile wireless devices impose some limitations on memory usage and resource allocation.

Figure 5:
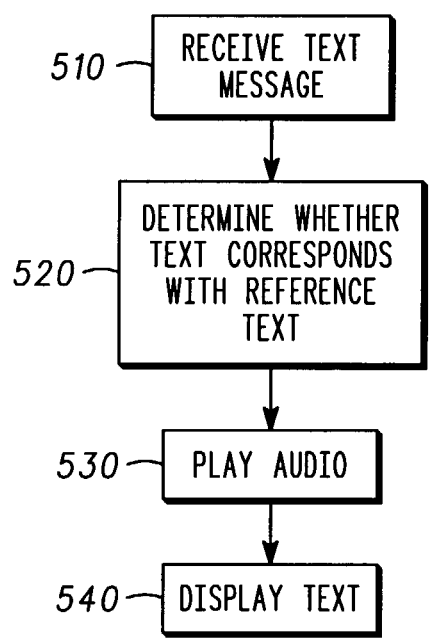
FIG. 5 is an exemplary process flow diagram for playing audio information associated with text in an incoming text message.

In the exemplary process flow diagram of FIG. 5, at block 510, an incoming text message is received at a text-messaging device, which has stored thereon reference text associated with audio information. At block 520, a determination is made whether any text in the incoming text message corresponds to, in other matches, any reference text associated with audio information stored on the mobile wireless communication device.

In one embodiment, the determination of whether any text in an incoming text message corresponds to reference text associated with the audio information stored on the mobile wireless communication device is performed by comparing text in the incoming text message with the reference text stored previously on the mobile wireless communication device in association with the audio information.

In one embodiment, a text message/reference text comparison program segment stored in memory determines whether text in a text message received by the receiver corresponds with the reference text stored in memory. Below is an exemplary pseudo-code algorithm for scanning and comparing text strings in an incoming SMS text message for correspondence with reference text stored previously in a memory table of the text-messaging device in association with a musical song.

```
Begin;
    Mp == beginning of SMS message.
    Songlist == Null;
    While (L < Message Length) do
        For each entry in the musical associations table do;
            S = entry->string;
            L = strlen(S);
            If (strcmpn(Mp,S,L) == 0) then /* a match */
                Push(entry->song,Songlist);
                Mp += L-1;
                Break;
            EndIf;
        EndFor
        Mp++;
    End While;
End;
```

The exemplary algorithm disallows overlapping matched messages and uses a simple first message matched strategy. In other embodiments, overlapping messages may be matched with corresponding reference text. For overlapping text, the corresponding audio may be played to overlap or it may be played serially. The exemplary algorithm is serial, although in other embodiments parallel-processing approaches may be utilized alternatively.

In FIG. 5, at block 530, audio is played on the mobile wireless communications device corresponding to the audio information associated with the reference text if any text in the incoming text message corresponds to the reference text associated with the audio information stored on the mobile wireless communication device. In some embodiments, a perfect match between the incoming text and reference text may be required, whereas in other embodiments substantial similarity may be sufficient to invoke playback of the associated audio.

Thus when a text message is received from a particular individual whose name has been associated with audio information stored on the text-messaging device, the audio associated with the name is played on the text-messaging device. In other embodiments, audio may be associated with one or more other words besides or in addition to names, for example greetings, expletives, etc. In one embodiment, the audio associated with the incoming text is played upon receipt of the text message. In other embodiments, the audio associated with the incoming text is played upon opening the text message, or it may be played in both instances.

An audio playing program segment stored in memory plays the audio corresponding to the audio information associated with the reference text if text in the text message received by the recipient text-messaging device corresponds with the reference text stored in memory. This program segment may open an audio file associated with the text or it may invoke the mixing of soundtracks or perform some other operation that prompt audio playback of the associated audio information. Many different audio invoking schemes are suitable for this aspect of the invention.

In FIG. 5, at block 540, upon opening the text message, any text in the incoming text message that corresponds to the reference text associated with the audio information is displayed on the text-messaging device. In other embodiments, the display of text and the audio playback is concurrent or the order of theses events may be reversed relative to that illustrate in FIG. 5.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a mobile wireless communication device, comprising:
   receiving an incoming text message,
   determining whether text in the incoming text message corresponds to reference text associated with audio information stored on the mobile wireless communication device;
   playing audio on the mobile wireless communication device corresponding to the audio information associated with the reference text if any text in the incoming text message corresponds to the reference text associated with the audio information stored on the mobile wireless communication device.

2. The method of claim 1, playing the audio upon receipt of the text message by the mobile wireless communication device.

3. The method of claim 1, playing the audio upon opening the text message on the mobile wireless communication device.

4. The method of claim 1,
   determining whether text in the incoming text message corresponds to reference text associated with the audio information stored on the mobile wireless communication device by comparing text in the incoming text message with the reference text stored previously on the mobile wireless communication device in association with the audio information stored on the mobile wireless communication device.

5. A method in a mobile wireless communication device, comprising:
   identifying text;
   associating the identified text with audio information stored on the mobile wireless communication device by mapping the identified text to the audio information;
   storing the identified text associated with the audio information on the mobile wireless communication device.

6. The method of claim 5, further comprising:
   receiving an incoming message;
   determining whether text in the incoming text message matches the identified text associated with the audio information stored on the mobile wireless communication device;
   playing sound on the mobile wireless communication device based on the audio information associated with the identified text if the text in the incoming text message matches the identified text associated with the audio information.

7. The method of claim 5, mapping the identified text to the audio information on the mobile wireless communication device by storing, on the mobile wireless communication device, an ASCII string corresponding to the identified text and a corresponding audio information reference identifying the audio information associated with the identified text.

8. The method of claim 5, associating the identified text with the audio information stored on the mobile wireless communication device by mapping an ASCII string corresponding to the identified text and an audio information reference in a multi-element table structure stored on the mobile wireless communication device.

9. A method in a wireless communications device, comprising:
   receiving an incoming text message having text;
   performing a function on the communications device associated with the text in the incoming text message;
   displaying the text of the incoming text message on a display of the communications device,
   performing the function on the wireless communication device includes playing audio stored on the wireless communication device in association with reference text matching the text in the incoming text message.

10. The method of claim 1, displaying any text in the incoming text message that corresponds to the reference text associated with the audio information.

11. The method of claim 5, receiving an incoming text message:

playing sound on the mobile wireless communication device based on the audio information associated with the identified text if text in the incoming text message matches the identified text associated with audio information stored on the mobile wireless communication device.

12. The method of claim 5, identifying text by selecting text displayed in a first text message;

receiving an incoming text message after identifying text;

playing sound on the mobile wireless communication device based on the audio information associated with the identified text if text in the incoming text message matches the identified text.

13. The method of claim 12, determining whether text in the incoming text message matches the identified text associated with the audio information stored on the mobile wireless communication device by comparing text in the incoming message with the identified text.

* * * * *